(12) United States Patent
Meehan

(10) Patent No.: US 12,450,522 B2
(45) Date of Patent: Oct. 21, 2025

(54) METHOD AND SYSTEM FOR ANALYZING PURCHASES OF SERVICE AND SUPPLIER MANAGEMENT

(71) Applicant: Premier Healthcare Solutions, Inc., Charlotte, NC (US)

(72) Inventor: Mickey Meehan, Walnut Creek, CA (US)

(73) Assignee: PREMIER HEALTHCARE SOLUTIONS, INC., Charlotte, NC (US)

( * ) Notice: Subject to any disclaimer, the term of this patent is extended or adjusted under 35 U.S.C. 154(b) by 325 days.

(21) Appl. No.: 17/876,789

(22) Filed: Jul. 29, 2022

(65) Prior Publication Data

US 2022/0366311 A1 Nov. 17, 2022

Related U.S. Application Data

(63) Continuation-in-part of application No. 16/899,766, filed on Jun. 12, 2020, now abandoned.
(Continued)

(51) Int. Cl.
| | | |
|---|---|---|
| *G06N 20/00* | (2019.01) | |
| *G06F 16/25* | (2019.01) | |
| *G06N 7/01* | (2023.01) | |

(52) U.S. Cl.
CPC ........... *G06N 20/00* (2019.01); *G06F 16/254* (2019.01); *G06N 7/01* (2023.01)

(58) Field of Classification Search
CPC ... G06F 3/0482; G06N 7/005; G06Q 30/0206
See application file for complete search history.

(56) References Cited

U.S. PATENT DOCUMENTS

2007/0087756 A1 * 4/2007 Hoffberg .......... G06Q 10/06375
455/450
2010/0106652 A1 4/2010 Sandholm et al.
(Continued)

FOREIGN PATENT DOCUMENTS

| CN | 107169518 A | * | 9/2017 | ........... G06F 16/254 |
| CN | 107622250 A | * | 1/2018 | ............... G06K 9/00 |
| CN | 108052528 A | * | 5/2018 | ......... G06F 16/2474 |

OTHER PUBLICATIONS

"Procurement Performance and Supplier Management Measurement Issues: A Case of Malaysian Private Company", by Nawi et al., School of Technology Management and Logistics, Universiti Utara Malaysia, Sintok, Kedah, Malaysia. Sup. Chain Mgt. Vo. 6, No. 1, Mar. 2017. (Year: 2017).*

(Continued)

*Primary Examiner* — Pan G Choy
(74) *Attorney, Agent, or Firm* — Moore & Van Allen PLLC

(57) ABSTRACT

The present invention relates to system, method and computer program product for customized processing temporal resources and constructing resource values. The system comprises a computer-executable platform comprising a resource value construction module that is structured to access a data storage module and determine a resource value offer of the resource. The system further comprises a Bayesian network connected to the computer-executable platform. Moreover, the system comprises a user interface connected to the Bayesian network, the user interface comprising: a selection module that is structured to receive a user section of an indication of resource; and a management module that allows the user to manage the information of the resources via the user interface.

18 Claims, 11 Drawing Sheets

Related U.S. Application Data

(60) Provisional application No. 62/861,245, filed on Jun. 13, 2019.

(56) References Cited

U.S. PATENT DOCUMENTS

| | | | |
|---|---|---|---|
| 2010/0211416 A1 | 8/2010 | Frank et al. | |
| 2013/0204754 A1 | 8/2013 | Brelig et al. | |
| 2013/0212486 A1* | 8/2013 | Joshi | H04W 4/02 715/744 |
| 2014/0269658 A1* | 9/2014 | Sadasivam | H04W 4/70 370/338 |
| 2016/0105308 A1 | 4/2016 | Dutt | |
| 2016/0266936 A1* | 9/2016 | Bryant | G06F 9/5055 |
| 2017/0031659 A1 | 2/2017 | Burke et al. | |
| 2018/0114127 A1* | 4/2018 | Cole | H04L 67/52 |
| 2020/0042920 A1* | 2/2020 | Moorthy | G06Q 30/0202 |
| 2020/0234198 A1* | 7/2020 | Feng | G06F 21/6245 |
| 2021/0029576 A1* | 1/2021 | Sorond | H04W 28/0268 |
| 2021/0216905 A1* | 7/2021 | Floratou | G06N 5/02 |
| 2022/0058517 A1* | 2/2022 | Cherry | G06Q 40/12 |
| 2023/0052423 A1* | 2/2023 | Vijayan | G06Q 30/016 |

OTHER PUBLICATIONS

"Supplier Relationship Management: A Case Study in the Context of Health Care", by Tobias Mettler and Peter Rohner, University of St. Gallen, Institute of Information Management. Journal of Theoretical and Applied Electronic Commerce Research, vol. 4, Issue 3, Dec. 2009 (Year: 2009).*

"The Pricing of Services", by Irene C. L. Ng, the University of Exeter, School of Business & Economics, Streatham Court, Rennes Drive, Exeter EX4 4PU, UK, 2014. (Year: 2014).

Adam Wamai Egesa, Analysis of Financial Transactions using Machine Learning, 2016 (Year: 2016).

Chris Feldsine, 5 Key Factors to Consider When Conducting a Supplier Evaluation, 2018 (Year: 2018).

* cited by examiner

METHOD AND SYSTEM FOR ANALYZING PURCHASES OF SERVICE AND SUPPLIER MANAGEMENT

CROSS-REFERENCE TO PRIORITY APPLICATION

This application is a continuation-in-part application of U.S. Non-Provisional patent application Ser. No. 16/899,766, filed on Jun. 12, 2020 entitled "Method and System for analyzing purchases of service and supplier management" published as U.S. Patent Application Pub. No. 2020/0394669 A1, which in turn claims priority to and the benefit of U.S. Provisional Patent Application Ser. No. 62/861,245, filed on Jun. 13, 2019 entitled "Method and System for analyzing purchases of service and supplier management," all of which are hereby incorporated by reference in their entirety.

FIELD OF THE DISCLOSURE

The present invention relates to methods, systems, and computer program products for processing temporal and dynamic resources, and constructing the same. In some instances, the invention involves processing resource transfers by analyzing purchased services, and more particularly involves constructing resource values by predicting the prices of the transactions based on the input of the user. The present invention relates to methods, systems, and computer program products for processing resource transfers and constructing resource values. In some instances, the invention involves processing resource transfers by analyzing purchased services, and more particularly involves constructing resource values by predicting the prices of the transactions based on the input of the user.

BACKGROUND

Source entities may comprise a variety of resources such as components, items, devices, services, etc. Typically, attributes of a resource are variable and fluctuate over time. Specifically, the resource values of resources vary over time, in an irregular manner. For instance, a current resource value of a resource at a first time may be distinct from a future resource value at a second time at which the resource is processed. A recipient resource system associated with receiving the resource transfer from the source entity is typically not able to ascertain resource values and cannot determine an optimal time for initiating the resource transfer at which time the resource value will be between a predetermined threshold. Accordingly, there is a need for a system structured for processing resource transfers and constructing resource values.

All referenced patents, applications, and literature are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The disclosed embodiments may seek to satisfy one or more of the above-mentioned desires. Although the present embodiments may obviate one or more of the above-mentioned desires, it should be understood that some aspects of the embodiments might not necessarily obviate them.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention provide a method, system and computer program product for processing resource transfers and constructing resource values, and analyzing information of resources. In some embodiments, the system comprises a computer-executable platform comprising a resource value construction module that is structured to access a data storage module and determine a resource value offer of the resource. The system further comprises a Bayesian network connected to the computer-executable platform. Moreover, the system comprises a user interface connected to the Bayesian network, the user interface comprising: a selection module that is structured to receive a user section of an indication of resource; and a management module that allows the user to manage the information of the resources via the user interface.

In some embodiments, or in combination with any of the previous embodiments, the data storage module comprises a supplier bid data which includes previous resource value offers which a plurality of source entities have offered to provide resources.

In some embodiments, or in combination with any of the previous embodiments, the data storage module comprises a contract data module which includes contract values, spends, and terms.

In some embodiments, or in combination with any of the previous embodiments, the data storage module comprises an organization report data which includes reports from organizations, wherein the reports comprise current resource value offers with the similar resource level.

In some embodiments, or in combination with any of the previous embodiments, the data storage module comprises prior purchase date, which includes the previous resource value offers of the resources that were provided by a plurality of source entities.

In some embodiments, or in combination with any of the previous embodiments, the selection module is structured to receive a customized resource value offer from the user, which is analyzed by the predictive module.

In some embodiments, or in combination with any of the previous embodiments, the resource value construction module comprises a resource value construction module that is structured to determine a prediction for a future direction of the resource value offer of the resource.

In some embodiments, or in combination with any of the previous embodiments, the resource value construction module comprises a predictive analyzer module that analyzes customized resource value offers and the future direction of the resource value offers.

In some embodiments, or in combination with any of the previous embodiments, the resource value construction module comprises a predictive advisor module that analyzes the previous resource value offers and the resource value offers so that the user can decide whether to accept the resource value offers from the source entities or the organizations.

Embodiments of the present invention provide a method, system and computer program product for customized processing temporal resources. In some embodiments, the system is structured for adapting non-temporal resource systems and establishing links between disparate data structures for analyzing data associated with temporal service resources via a Bayesian network. The system further comprises one or more memory devices having computer readable code stored thereon, at least one network communication device, one or more processing devices operatively coupled to the one or more memory devices and the at least one network communication device, wherein the one or more processing devices are configured to execute the computer readable code to: establish a first operative communication channel with a first user device; receive, via the first operative communication channel, a first user input from an input device of the user device, wherein the first user input is associated with a request for construction of a resource data structure associated with a service; determine at least one first service parameter associated with the service based on analyzing the first user input; activate a machine learning (ML) data system component, wherein the ML data system component is structured for establishing links between disparate data structures for analyzing data associated with temporal service resources; determine, via the ML data system component, a first set of data structure parameters associated with the (i) at least one first service parameter, and/or (ii) the service; determine, via the ML data system component, a second set of data structure parameters of the first set of data structure parameters that are structured to modify a resource value of the service; construct, via the ML data system component, the resource data structure for the service based on at least the second set of data structure parameters, wherein the resource data structure is associated with (i) a constructed dynamic resource value for the service, and/or (ii) constructed dynamic service level parameters for the service based on at least the second set of data structure parameters; and transmit, via the first operative communication channel, a control signal to the user device to cause a display device of the user device to present an interface comprising a representation of the resource data structure.

In some embodiments, or in combination with any of the previous embodiments, the first user input for construction of the resource data structure is associated with one or more predetermined service level parameters associated with the service; the at least one first service parameter is the one or more predetermined service level parameters determined based on analyzing the first user input; and constructing, via the ML data system component, the resource data structure for the service further comprises: constructing the dynamic resource value for the service, wherein the dynamic resource value for the service is structured to adapt to the one or more predetermined service level parameters associated with the service associated with a predetermined time interval.

In some embodiments, or in combination with any of the previous embodiments, presenting the representation of the resource data structure comprises: constructing a graphical representation of the dynamic resource value for the service; and presenting the graphical representation of the dynamic resource value via the interface on the display device of the user device, wherein the graphical representation of the dynamic resource value is structured to be adaptive and interactive such that modifications to the second set of data structure parameters is structured to cause a modification to the graphical representation of the dynamic resource value.

In some embodiments, or in combination with any of the previous embodiments, the graphical representation of the dynamic resource value comprises (i) a graphical representation of a plurality of resource value elements, and (ii) a probability element coupled with each of the plurality of resource value elements, and the dynamic resource value is associated with a prediction for a future direction of the dynamic resource value for the service.

In some embodiments, or in combination with any of the previous embodiments, the first user input for construction of the resource data structure is associated with a resource value element for the service; the at least one first service parameter is determined based on analyzing the service; and constructing, via the ML data system component, the resource data structure for the service further comprises: determining a first combination of the second set of data structure parameters that produce a temporary resource value that is within a predetermined matching threshold from the resource value element; and constructing the dynamic service level parameters such that the dynamic service level parameters that match the first combination of the second set of data structure parameters.

In some embodiments, or in combination with any of the previous embodiments, presenting the representation of the resource data structure comprises: constructing a graphical representation of the dynamic service level parameters for the service; and presenting the graphical representation of the dynamic service level parameters via the interface on the display device of the user device.

In some embodiments, or in combination with any of the previous embodiments, the invention is structured to: construct a source entity resource instruction file associated with (i) the constructed dynamic resource value for the service, and/or (ii) the constructed dynamic service level parameters for the service based on at least the second set of data structure parameters, in response to receiving a second user input received from the user device; establish a second operative communication channel with a source entity system; transmit, via the second operative communication channel, the source entity resource instruction file to the source entity system; and receive, via the second operative communication channel, a source entity response indicating confirmation (i) the constructed dynamic resource value for the service, and/or (ii) the constructed dynamic service level parameters for the service.

In some embodiments, or in combination with any of the previous embodiments, the invention is structured to: retrieve a plurality of historical service files from one or more data storage locations, wherein the plurality of historical service files comprise unstructured data associated with one or more historical service events; parse each of the plurality of historical service files to determine (i) an associated service category, and (ii) one or more historical service level parameters associated with each of the one or more historical service events; extract unstructured data associated with at least the one or more historical service level parameters associated with each of the one or more historical service events from the plurality of historical service files; transform the extracted unstructured data associated with the one or more historical service level parameters associated with each of the one or more historical service events into structured training data; and construct one or more training data files comprising the structured training data.

In some embodiments, or in combination with any of the previous embodiments, the invention is structured to: provide the one or more training data files to the ML data system component as an input; and train the ML data system component to determine the first set of data structure parameters, determine the second set of data structure parameters of the first set of data structure parameters that are structured to modify a resource value of the service, construct the constructed dynamic resource value for the service, and/or construct the dynamic service level parameters for the service, based on training the ML data system component with the one or more historical service events of the one or more training data files.

In some embodiments, or in combination with any of the previous embodiments, the ML data system component is associated with a Bayesian network.

In some embodiments, or in combination with any of the previous embodiments, receiving the first user input for construction of the resource data structure associated with the service further comprises receiving a user selection of a service from a plurality of services presented at the interface of the display device of the user device.

Some embodiments of the invention are directed to a method performed by a computer for providing pricing information for resources. The method comprises the steps of: providing a computer-executable platform having a resource value construction module and a data storage module structured to provide a supplier bid data, a contract data, an organization data, and a prior purchase data to the resource value construction module; providing a user interface having a selection module that is structured to receive user selections of indications of the resources; receiving the selected indications of the resources from the selection module and transmitting the selected indications to the resource value construction module, and analyzing the selected indications of the resources to generate resource value offers of the resources.

According to some aspects of the invention, in a general implementation, a computer system for analyzing information of services comprises a computer-executable platform comprising a predictive price module that accesses a data storage module and determines an offer price of the service; a Bayesian network connected to the computer-executable platform; and a user interface connected to the Bayesian network; wherein the user interface comprises a selection module that provides the user to select an indication of service and a management module that provides the user to manage the information of the services.

In another aspect combinable with the general implementation, at least one of the data storage module comprises a supplier bid data which includes previous offer prices which a plurality of suppliers have offered to provide services.

In another aspect combinable with the general implementation, at least one of the data storage module comprises a contract data module which includes contract values, spends, and terms.

In another aspect combinable with the general implementation, at least one of the data storage module comprises an organization report data which includes reports from organizations, wherein the reports comprise current price offers with the similar service level.

In another aspect combinable with the general implementation, at least one of the data storage module comprises prior purchase date, which includes the previous offer prices of the services that provide by a plurality of suppliers or organizations.

In another aspect combinable with the general implementation, at least one of the selection module can provide the user to input customized offer price, which is analyzed by the predictive module.

In another aspect combinable with the general implementation, at least one of the predictive price module comprises a predictive price module that determined a prediction for a future direction of the offer price of the service.

In another aspect combinable with the general implementation, at least one of the predictive price module comprises a predictive analyzed module that analyzes customized offer prices and the future direction of the offer prices.

In another aspect combinable with the general implementation, at least one of the predictive price module comprises a predictive advisor module that analyzes the previous offer prices and the offer prices so that the user can decide whether to accept the offer prices from the suppliers or the organizations.

Another aspect of the embodiment is directed to methods of providing pricing information for services, the method comprising: providing a computer-executable platform having a predictive price module and a data storage module to provide a supplier bid data, a contract data, an organization data, and a prior purchase data to the predictive price module; providing a user interface having a selection module that provides the user to select an indication of the services; providing selected indications of the services by the selection module and receiving the selected indications by the predictive price module; and analyzing the selected indications of the services to generate offer prices of the services.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above and below as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
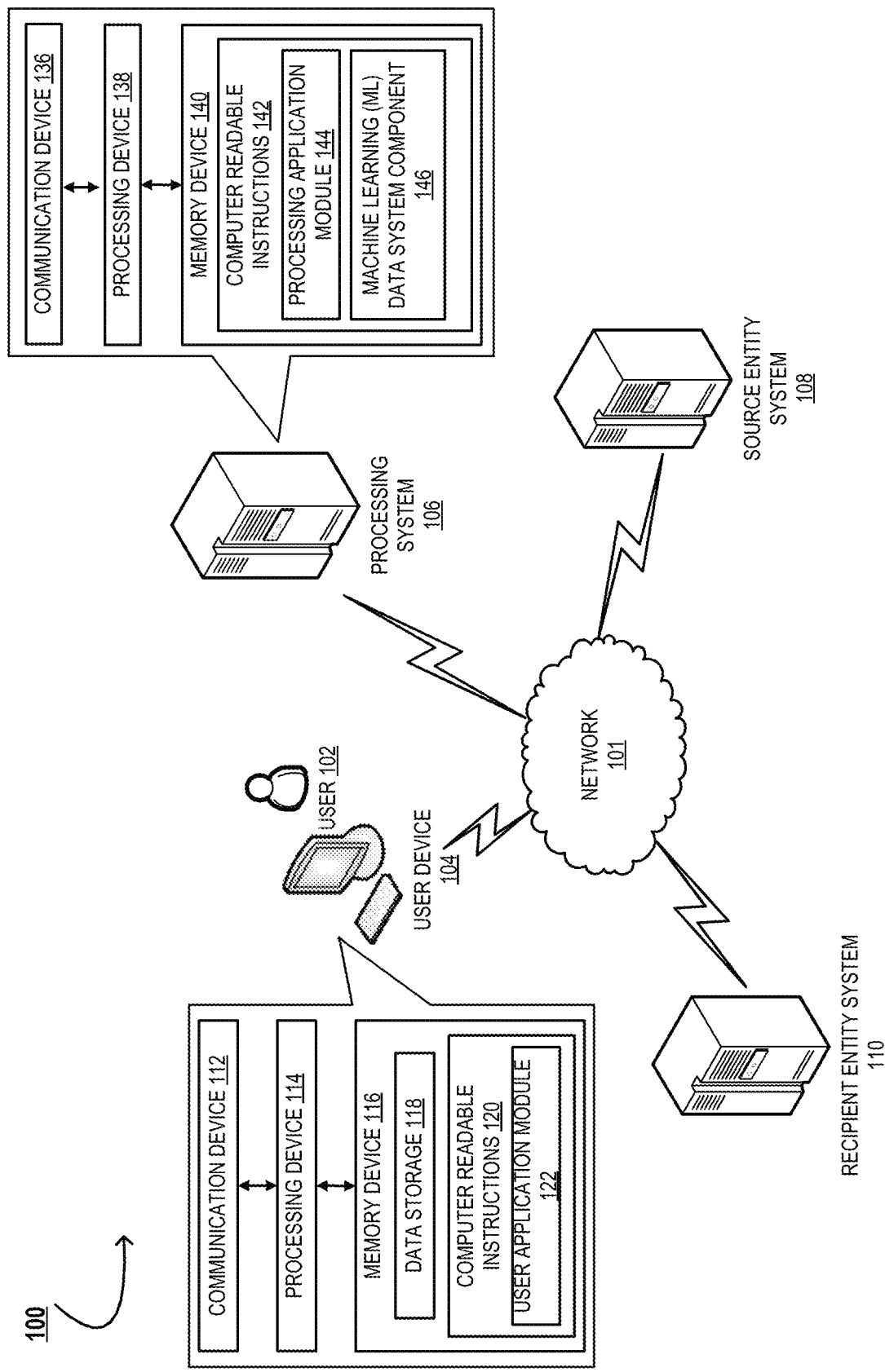

Having thus described embodiments of the invention in general terms, reference will now be made to the accompanying drawings, wherein:

FIG. 1 illustrates a processing system environment, in accordance with one embodiment of the invention.

Figure 2:
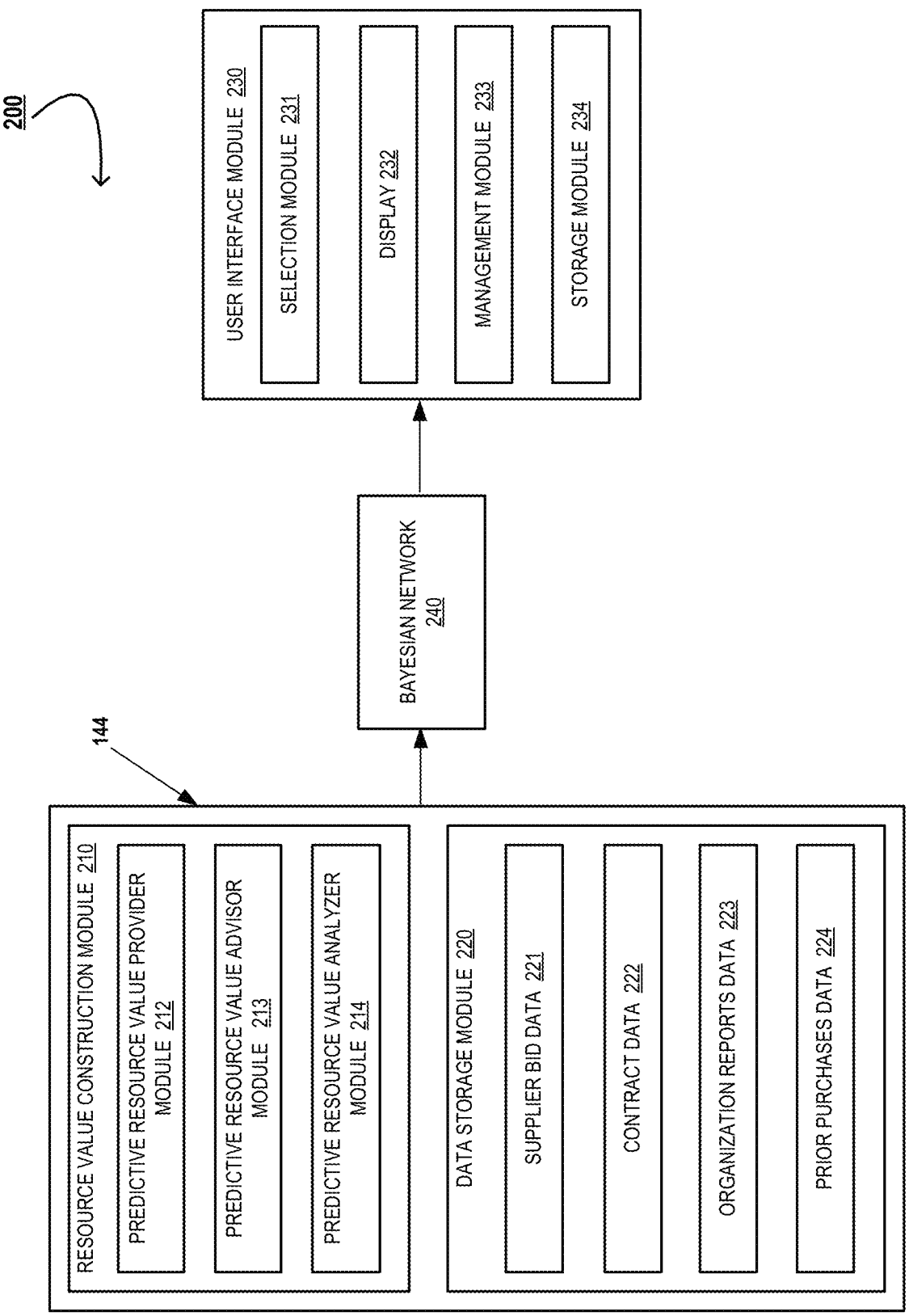

FIG. 2 illustrates a schematic representation of system components for processing resource transfers and constructing resource values, in accordance with one embodiment of the invention.

Figure 3:
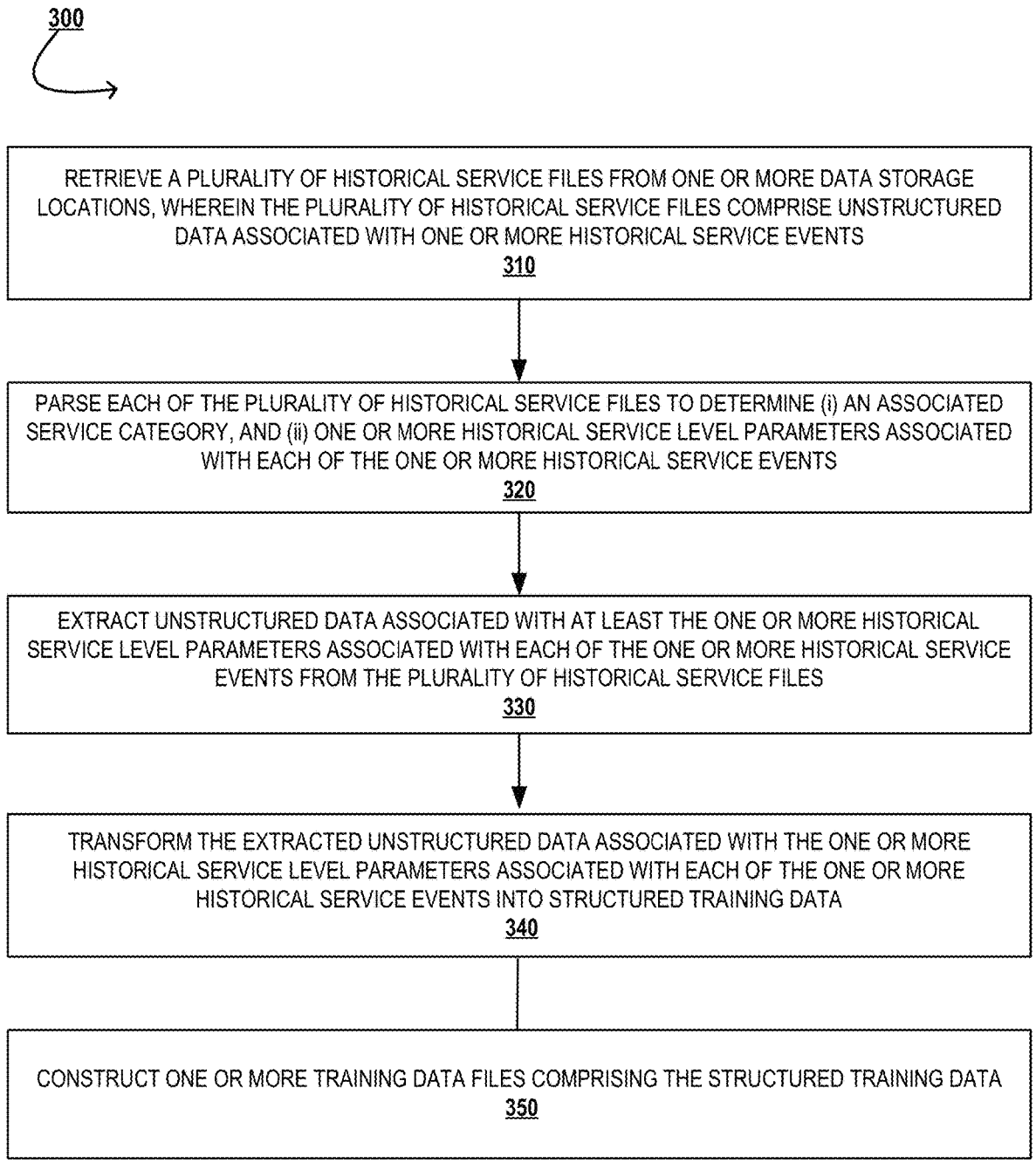

FIG. 3 illustrates a high level process flow for training a machine learning data system component, in accordance with one embodiment of the invention.

Figure 4:
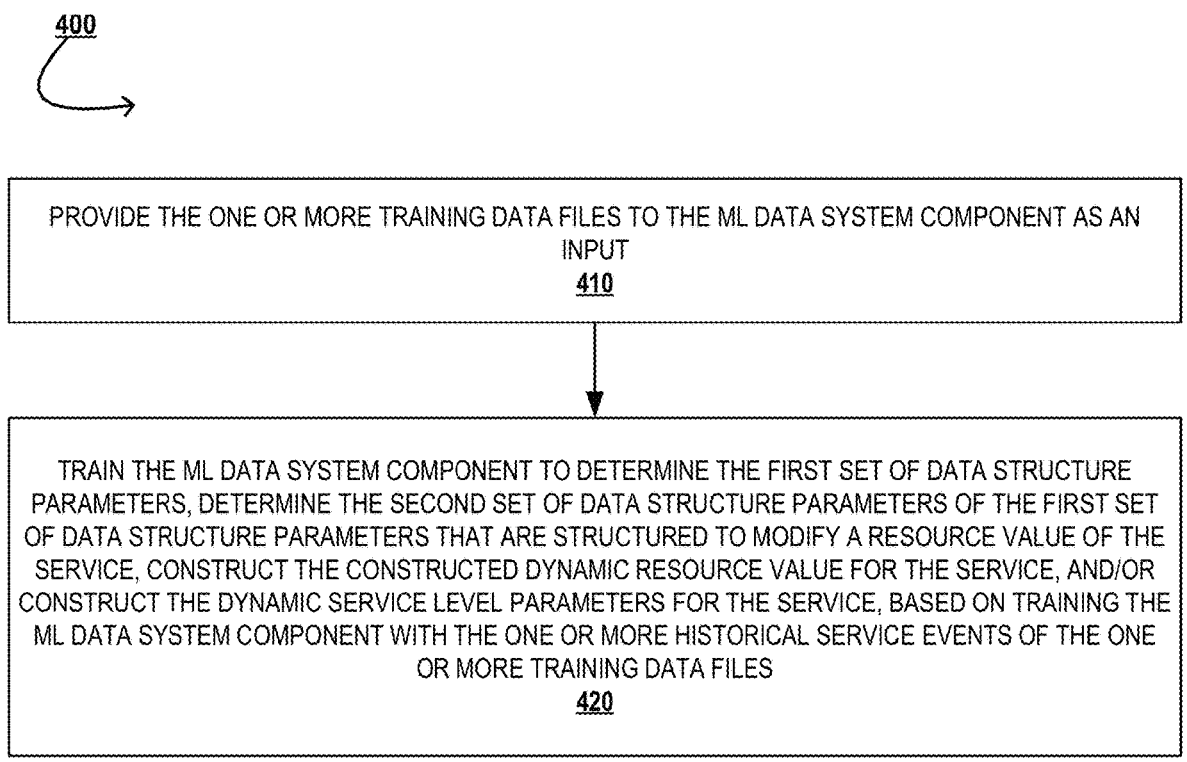

FIG. 4 illustrates a high level process flow for training a machine learning data system component, in accordance with one embodiment of the invention.

Figure 5A:
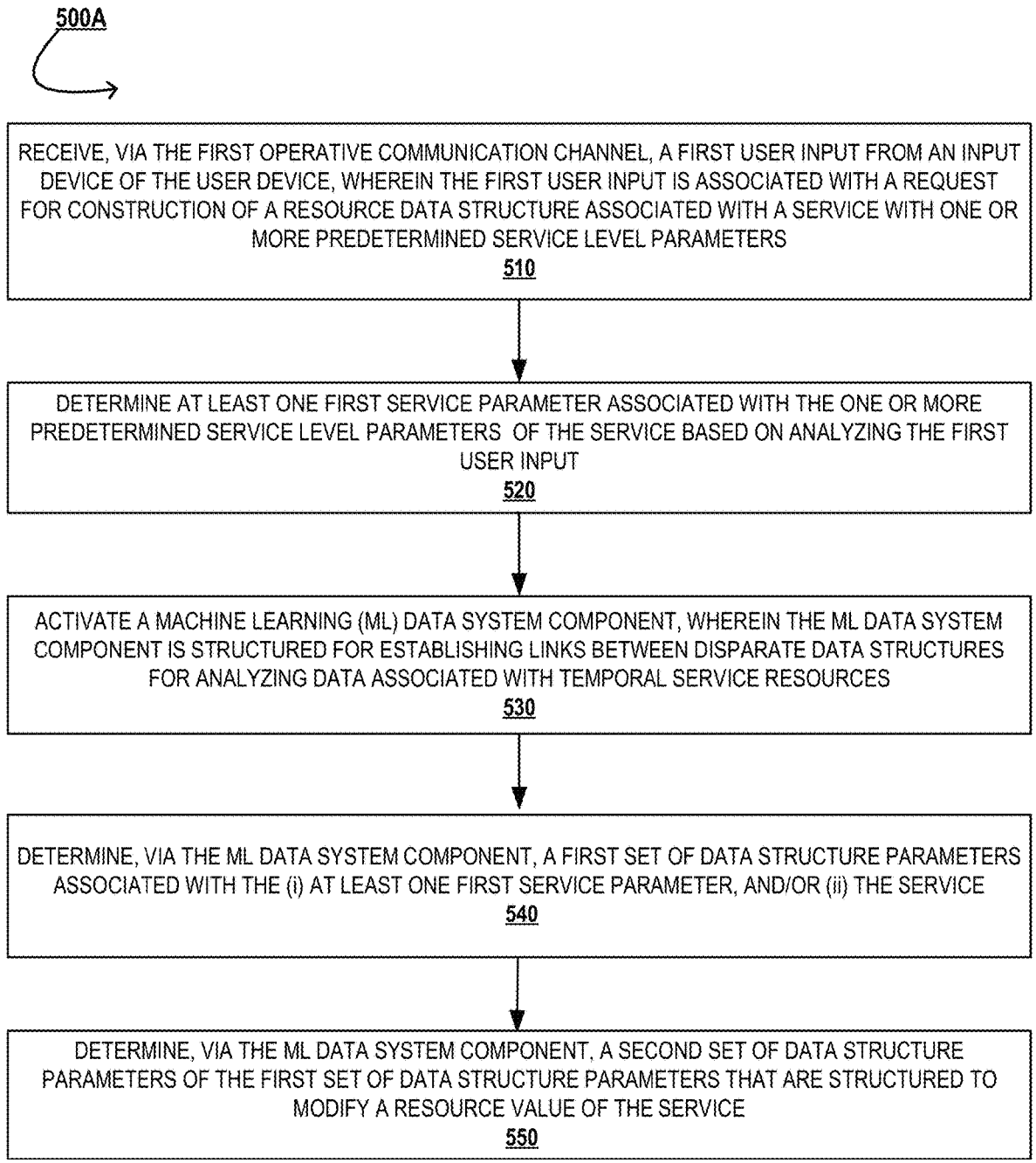

FIG. 5A illustrates a high level process flow for customized processing of temporal resources, in accordance with one embodiment of the invention.

Figure 5B:
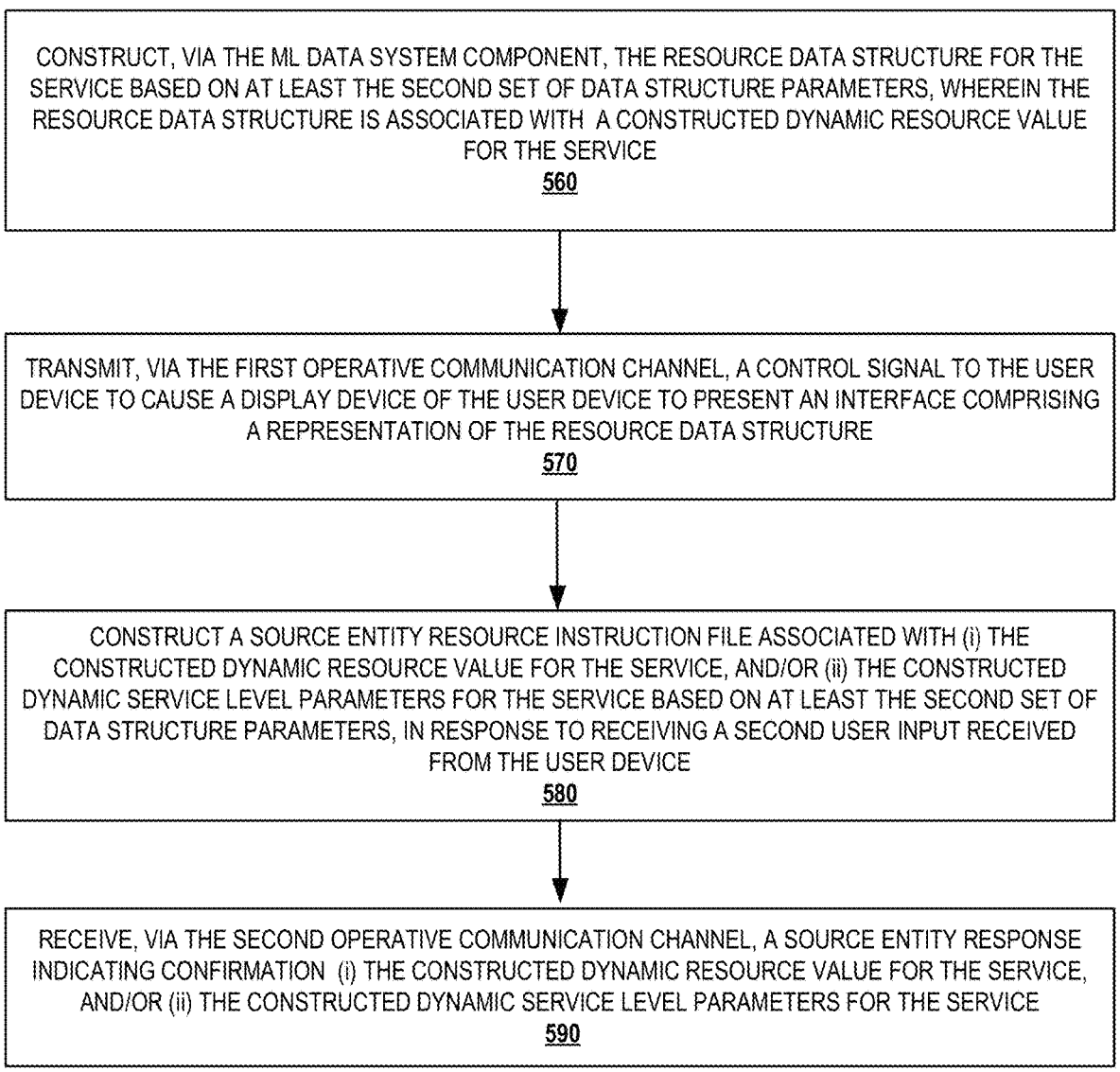

FIG. 5B illustrates a high level process flow for customized processing of temporal resources, in accordance with the embodiment of FIG. 5A.

Figure 6A:
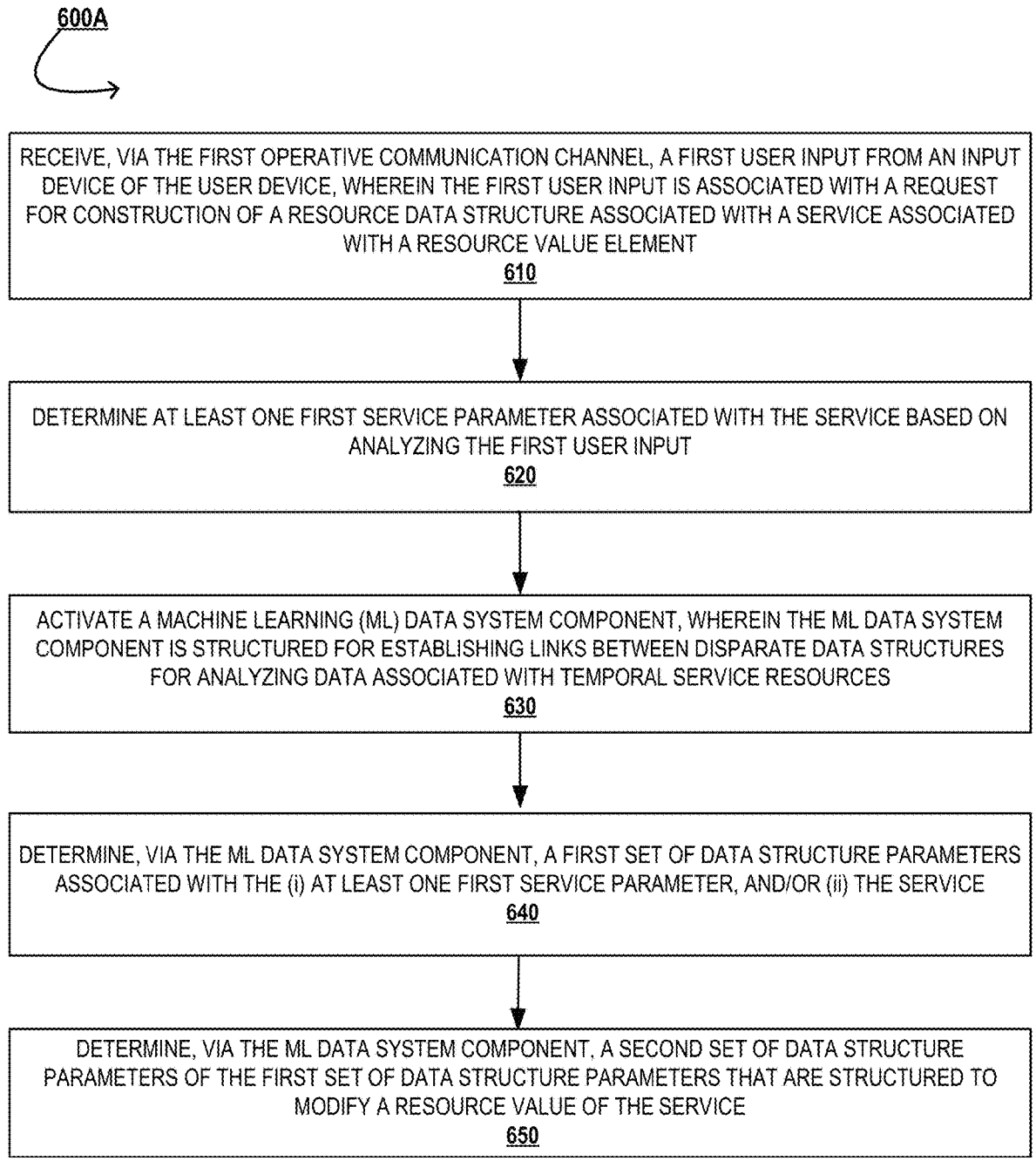

FIG. 6A illustrates a high level process flow for customized processing of temporal resources, in accordance with one embodiment of the invention.

Figure 6B:
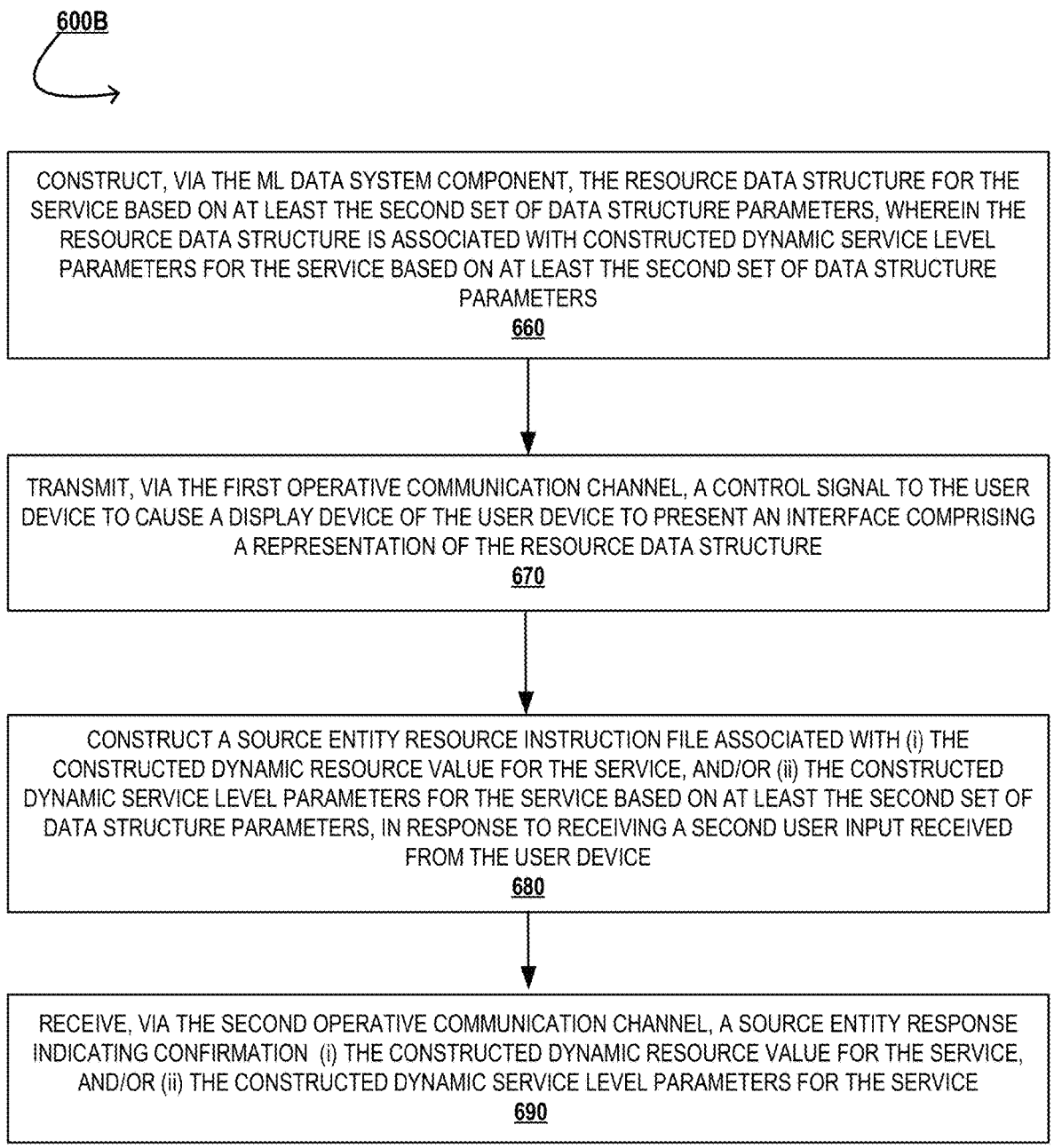

FIG. 6B illustrates a high level process flow for customized processing of temporal resources, in accordance with the embodiment of FIG. 6A.

Figure 7:
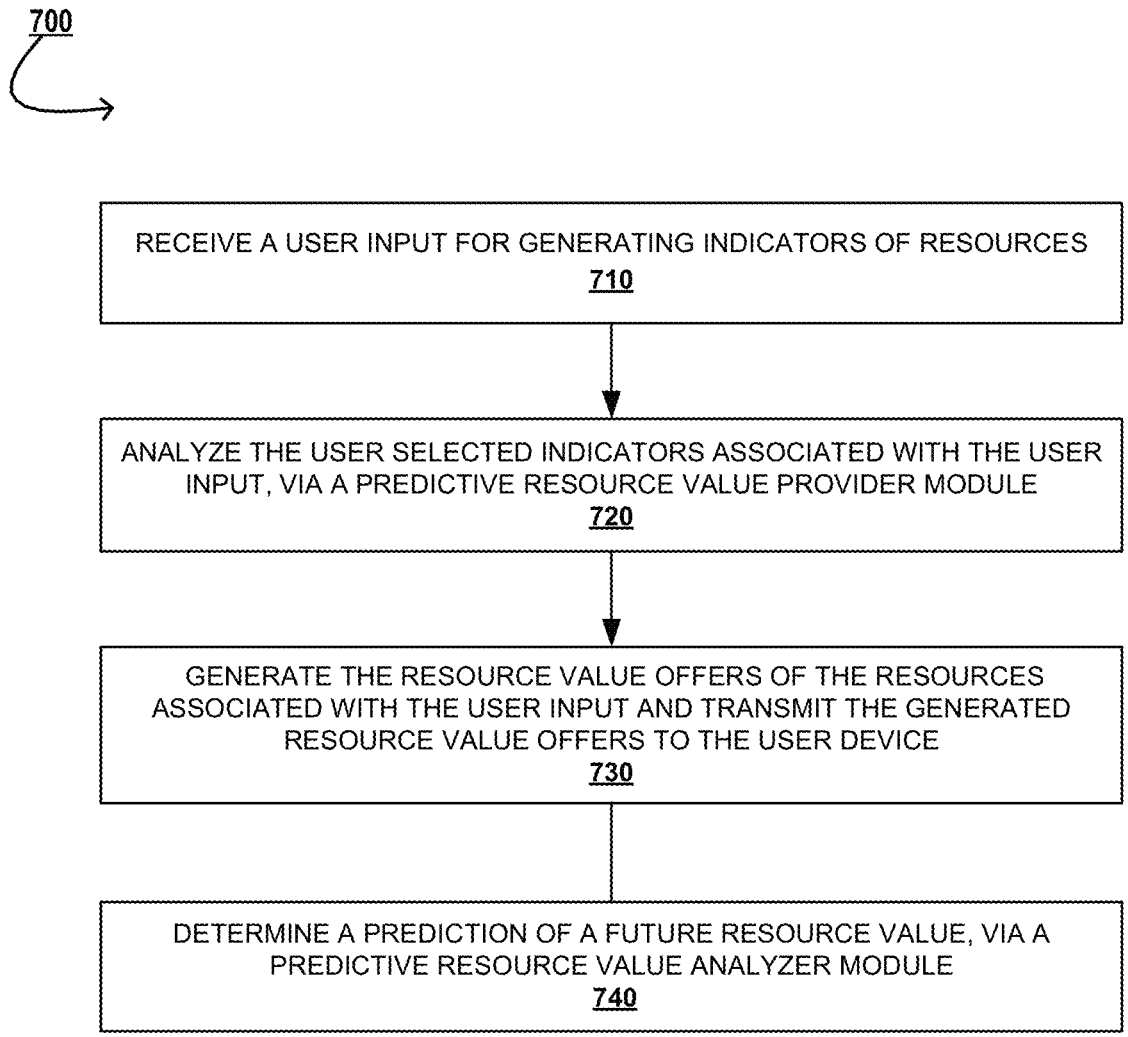

FIG. 7 illustrates a high level process flow for a method and process for processing resource transfers and constructing resource values, in accordance with one embodiment of the invention.

Figure 8:
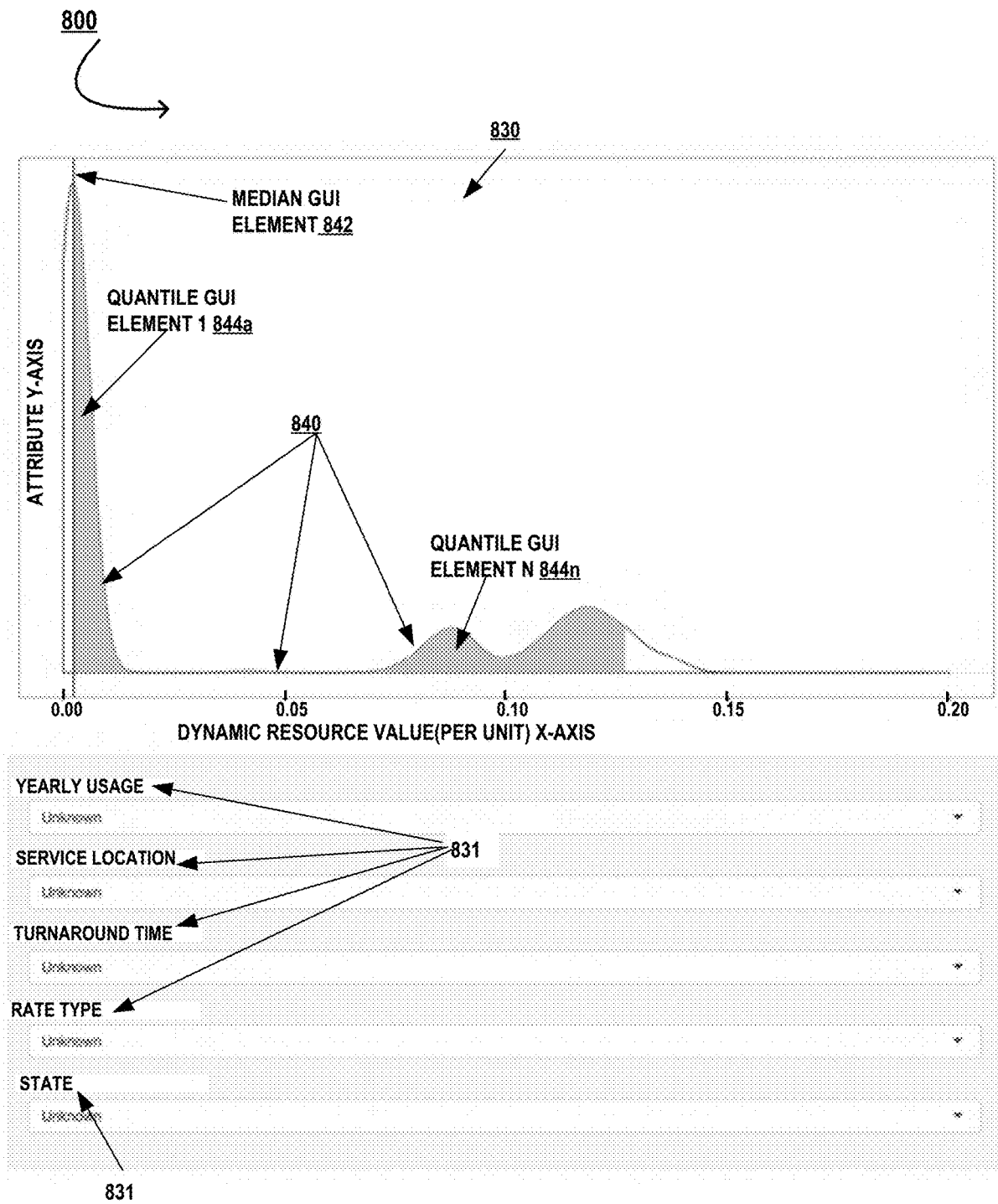

FIG. 8 illustrates a schematic depiction of an interface for processing resource transfers and constructing resource values, e.g., for analyzing purchases of services and supplier management according to the aspect of the embodiment, in accordance with one embodiment of the invention.

Figure 9:
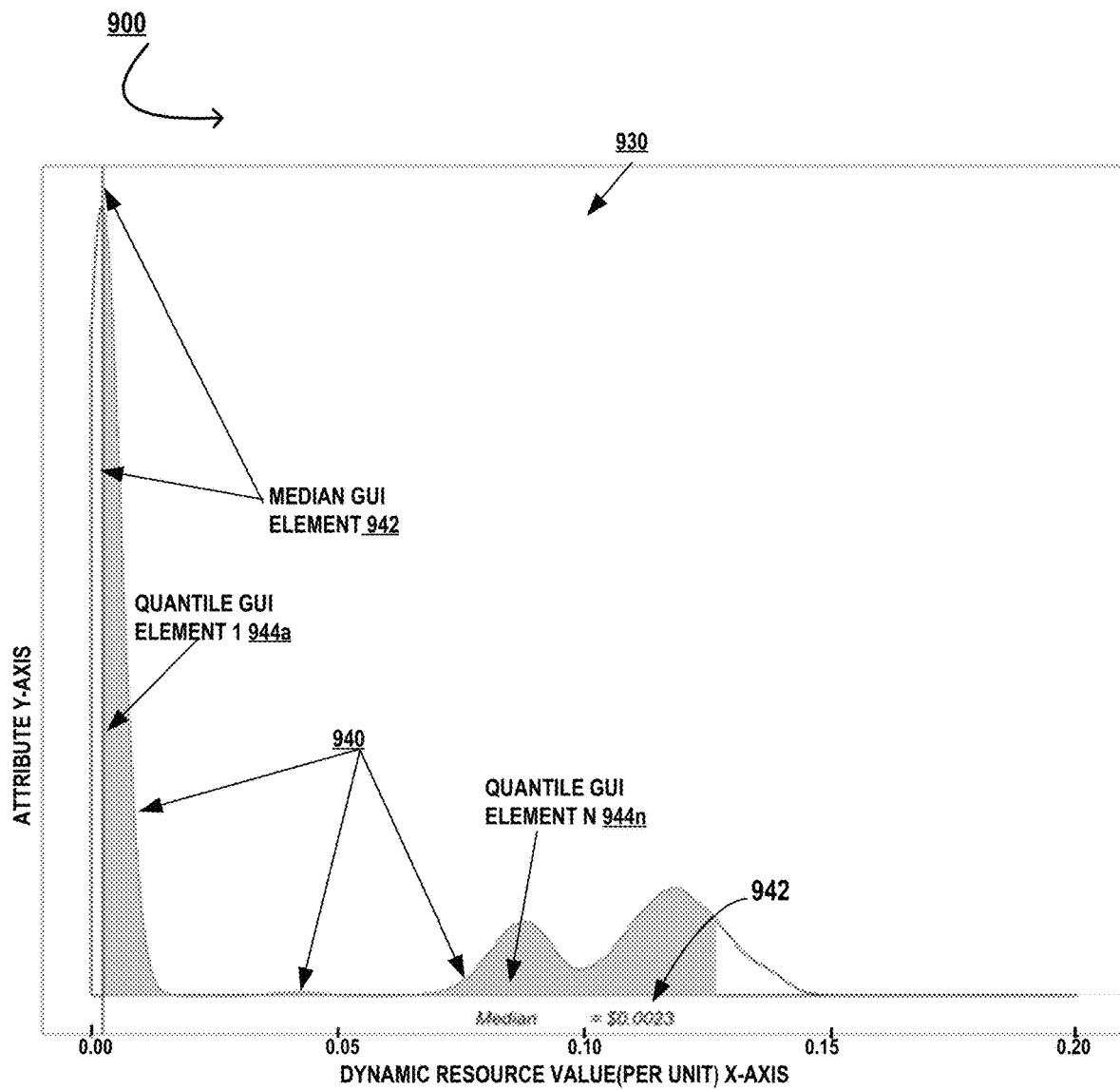

FIG. 9 illustrates a schematic depiction of a graphical representation of the constructed resource values, in accordance with one embodiment of the invention.

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

The different aspects of the various embodiments can now be better understood by turning to the following detailed description of the embodiments, which are presented as illustrated examples of the embodiments defined in the claims. It is expressly understood that the embodiments as defined by the claims may be broader than the illustrated embodiments described below.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Resources may comprise components, items, devices, services, and/or the like. Each resource may comprise one or more resource attributes such as a resource value. A resource value of a resource may refer to a cost, price and/or the like of the resource. Static resources, such as goods, may refer to resources whose component parameters are constant and hence do not cause a variation in its resource value. Typically, each static resource or good may be assigned a standard identifier (such as a stock-keeping unit (SKU)). The resource value of the static resource or good is a standard data point. Changes to the resource value or price of a static resource or good merely takes the form of standard data points that can be easily tracked using the respective standard identifier (such as the SKU) of the static resource or good. That said, in some embodiments, the resource value of a resource may refer to a non-monetary attribute or indicator of the resource such as importance parameters, attributes, weights, and/or the like Temporal resources, such as services, may refer to resources, whose inherent parameters are variable, dynamic, temporal. As a non-limiting example, temporal resource or service may comprise a variety of parameters (e.g., components/factors of the service), such as service category, turn-around time, service class, geographic locations, associated supplier, and/or the like, which are inherently variable for each instance of provision of the same service. As such, two instances of provision of the same temporal resource or service may not be comparable, much less two disparate temporal resources or services, if each and every service parameter is not present and identical. Each temporal resource or service may comprise one or more resource attributes such as a resource value (e.g., an offer price of a service, a predicted price of a service, and/or the like) that is affected by or shaped by the respective parameters (e.g., components/factors of the service). Unlike static resources such as goods, whose value changes are standard data points which can be easily tracked using respective standard identifiers or SKUs, the inherent complex nature of temporal resources or services does not allow for similar tracking. Resource values, such as historical prices of two same or disparate temporal resources or services may not be comparable if each and every parameter/component/factor is not identical. The present invention employs machine learning to analyze each of the temporal resources or services' components/factors historically (which may be unlimited), and predicts the resource value or price of a service based on the analysis of historical variable and variations associated with the service components/factors based on matching comparable/analogous factors of the service for which pricing prediction is desired. Moreover, the invention allows for negotiation of both service level and price at the same time.

In some embodiments, a "source entity" or "supplier entity" as used herein may be any institution associated with providing resources, and temporal resources in particular. In some embodiments, the "source entity" or "supplier entity" is a supplier associated with providing medical resources such as medical services, services for hospitals, medical devices, medical equipment, and/or the like. That said, the source entity or supplier entity may be any institution, group, association, establishment, company, union, manufacturer, supplier, seller, and/or the like. In particular, in some embodiments, a "source entity" or "supplier entity" as used herein may be any institution associated with providing temporal and dynamic resources such as services.

In some embodiments, an "recipient entity" or "buyer entity" as used herein may be any institution (such as a hospital, medical institution, etc.) associated with receiving/obtaining resources (e.g., services) from the source/supplier entity. The source/supplier entity may transfer the resource (e.g., provide the service or initiate/commence the service, etc.) to the recipient/buyer entity. This resource transfer may also be referred to as a purchase, such that a resource value may be transmitted from the recipient/buyer entity to the source/supplier entity, in exchange for the resource transfer from the source/supplier entity to the recipient/buyer entity. That said, the recipient/buyer entity may be any institution, group, hospital, medical facility, association, establishment, company, union, manufacturer, buyer, intermediate seller, and/or the like.

In some embodiments, a "user" as used herein may be any individual or institution associated with receiving resources from the source/supplier entity, e.g., via a resource transfer therebetween. In some embodiments, the "user" is also referred to as a customer of the source/supplier entity (e.g., a supplier). In this regard, the user may be associated with the recipient/buyer entity or an employee of the recipient entity or buyer entity (such as a hospital, medical institution, etc.).

As alluded to earlier, source entities may comprise a variety of resources such as components, items, devices, services, etc. Typically, the resource values of resources vary over time, in an irregular manner. For instance, a current resource value of a resource at a first time may be distinct from a future resource value at a second time at which the resource is processed. A recipient resource system associated with receiving the resource transfer from the source entity is typically not able to ascertain resource values and cannot determine an optimal time for initiating the resource transfer at which time the resource value will be between a predetermined threshold. Here, many potential recipients/buyers may face difficult decisions when attempting to determine whether acquiring particular resource (e.g., one or more items or services) under current conditions is desirable or optimal based on their goals. In other words, the recipients/buyers may delay the acquisition of the resource. For example, when the recipients/buyers desire to obtain the resource at the lowest price (e.g., below a predetermined threshold) before some future date, and the service is currently offered by a source/supplier for a current resource value (e.g., price), the potential recipients/buyers need to evaluate whether accepting the current resource value (e.g., price) is more advantageous than the potential benefits and costs associated with the market prices, or waiting to see if the resource (e.g., item or service) will continue to be available and will be later offered at a lower resource value (e.g., price) before the future date.

Thus, it would be beneficial to be able to predict future pricing information for the services and compare the market prices of the services with the current prices of the services, as doing so would enable buyers and/or intermediate sellers to make better acquisition-related decisions.

Accordingly, the present invention provides a solution to the foregoing problems in existing technology and provides a system structured for processing resource transfers indicated by the users to determine optimal time for initiating the resource transfer at which time the resource value will be between a predetermined threshold. The claimed invention is directed to constructing resource values of temporal resources such as services. Here, the present invention predicts future resource value (e.g., pricing) information for the resource (e.g., one or more items or services) and compares the market prices of the resource (e.g., one or more items or services) with the current prices of the resource, as doing so would enable recipients/buyers and/or intermediate sellers to make better acquisition-related decisions. Moreover, unlike goods which are associated with a unique identifier (e.g., a SKU), and whose values can be tracked using the same. However, service by their very nature and immensely variable sub-components and characteristics cannot be associated with unique identifiers nor can they be tracked with the same. The present invention comprises provides a solution to this problem in existing technology by providing a dynamic system that is structured for constructing resource values of temporal resources such as services. The present invention is rooted in technology and provides improvements to existing technology applications.

FIG. 1 illustrates a processing system environment 100, in accordance with one embodiment of the invention. As illustrated in FIG. 1, a processing system 106 is operatively coupled, via a network 101 to a user system/device 104 associated with a user 102, a source entity system 108 (also referred to as a source entity system 108) associated with the source/supplier entity, and/or a recipient entity system 110 (also referred to as a buyer system 110) associated with the recipient/buyer entity. The processing system 106 may also be referred to as a "computing system", "computing device," "server" or "system". FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

The network 101 may be a global area network (GAN), such as the Internet, a wide area network (WAN), a local area network (LAN), near field communication network, audio/radio communication network, ultra-high frequency wireless communication network, or any other type of network or combination of networks. The network 101 may provide for wireline, wireless, or a combination wireline and wireless communication between devices on the network 101.

FIG. 1 also illustrates a user system 104. The user device 104 may be, for example, a desktop personal computer, a mobile system, such as a cellular phone, smart phone, personal data assistant (PDA), laptop, a server system, another computing system and/or the like. The user device 104 may comprise a communication device 112, a processing device 114, and a memory device 116. The memory device 116 may comprise a data storage 118, along with computer readable instructions 120 for a user application 122. The processing system 106 may transmit control signals/instructions to the user device 104, via the network 101, to cause the user application 122 to display a resource interface (e.g., the interface illustrated in FIG. 4) on a display device/component of the user device 104. The user device 104 is typically a computing system that is configured to enable user and device authentication for access to resource processing results, request for resource processing, etc. The processing device 114 is operatively coupled to the communication device 112 and the memory device 116. The processing device 114 uses the communication device 112 to communicate with the network 101 and other devices on the network 101. As such, the communication device 112 generally comprises a modem, server, or other device for communicating with other devices on the network 101.

The user device 104 comprises computer-readable instructions 120 and data storage 118 stored in the memory device 116, which in one embodiment includes the computer-readable instructions 120 of a user application 122. In some embodiments, the processing system 106, and its processing device 138 and processing application module 144 in particular, are configured to cause the processing device 114 to execute the computer readable instructions 120, thereby causing the user device 104 to perform one or more functions described herein, for example, via the user application 122 and the associated user interface of the user application 122. In some embodiments, the user 102 may employ the user application 122 for providing user inputs, requests for construction of a resource data structures associated with a service, view graphical representations of the constructed resource data structure, modify the interactive graphical representations of the constructed resource data structure, request construction of a source entity resource instruction file, and/or the like. Here, the user application 122 may comprise an interface (e.g., in the form of a graphical user interface (GUI)) structured to receive user input, e.g., in the form of characters, text, etc., presented on a display device of the user device 104.

The processing system 106 typically comprises at least one processing device 138 that is structured to perform one or more of the steps/functions associated with for processing resource transfers and constructing resource values described herein (e.g., as described below with respect to FIGS. 2-4). Typically, the at least one processing device 138 is structured to perform one or more of the steps/functions described herein based on executing computer readable instructions/code 142 of a processing application module 144 and a machine learning (ML) data system component 146 stored on a memory device 140. The processing system 106 may be in operative communication with and may transmit signals to and receive signals from, the user device 140, the recipient entity system 110 and/or the source entity system 108 associated with the supplier entity. The processing system 106, and the processing application module 144 in particular, is structured for processing resource transfers and constructing resource values, e.g., based on executing computer-readable instructions 142. Specifically, the processing system 106, and the processing application module 144 and ML data system component 146 in particular is structured for processing resource transfers by analyzing purchased services, and more particularly constructing resource values by predicting the prices of the transactions based on the input of the user. FIG. 1 illustrates only one example of an embodiment of the system environment 100, and it will be appreciated that in other embodiments one or more of the systems, devices, or servers may be combined into a single system, device, or server, or be made up of multiple systems, devices, or servers.

It is understood that the servers, systems, and devices described herein illustrate one embodiment of the invention. It is further understood that one or more of the servers, systems, and devices can be combined in other embodiments and still function in the same or similar way as the embodiments described herein.

In some embodiments, the term "module" or "unit" as used herein may refer to a functional assembly (e.g., packaged functional assembly) of one or more associated electronic components and/or one or more associated technology applications, programs, and/or codes. Moreover, in some instances, a "module" or "unit" together with the constituent electronic components and/or associated technology applications/programs/codes may be independently operable and/or may form at least a part of the system architecture. In some embodiments, the term "module" or "unit" as used herein may refer to at least a section of a one or more associated technology applications, programs, and/or codes and/or one or more associated electronic components.

FIG. 2 illustrates a schematic representation 200 of system components for processing resource transfers and constructing resource values, in accordance with one embodiment of the invention. Specifically, FIG. 2 generally depicts a computer system and its components associated with the processing application module 144 of the processing system 106, which is structured for analyzing purchases of services and supplier management in accordance with one of the disclosed embodiments.

The processing application module 144 may also be referred to as a computer-executable platform. The processing application module 144 may comprise a resource value construction module 210 also referred to as a predictive price module and a data storage module 220, which are in operative communication with each other. The resource value construction module 210 is structured to access a data storage module 220, so as to determine a resource value (e.g., offer price) of a resource (e.g., item or service). As illustrated by FIG. 2, the resource value construction module 210 comprises a predictive resource value provider module 212 (also referred to as a predictive price provider module 212), a predictive resource value advisor module 213 (also referred to as a predictive price advisor module), and a predictive resource value analyzer module 214 (also referred to as a predictive price analyzer module 214).

As illustrated by FIG. 2, the data storage module 220 comprises a supplier bid data component 221, a contract data component 222, an organization reports data component 223, and a prior purchase data component 224. Typically, the supplier bid data 221 comprises previous resource value offers (e.g., previous offer prices) which a plurality of source/supplier entities have previously offered to provide resources (e.g., items or services). The contract data 222 typically comprises contract values, spends, terms, and/or the like. The organization reports data 223 typically comprises reports from organizations. These reports comprise current resource value offers (e.g., current price offers) with a similar resource/service level. The prior purchases data 224 typically comprises the previous resource values (e.g., previous purchase prices, offer prices, etc.) of the services provided by a plurality of source/supplier entities or organizations, and/or previous resource values or purchase prices of resources obtained by the recipient/buyer entity from the source/supplier entities.

In one embodiment, processing application module 144 is operatively coupled with a user interface module 230 of the user device 104, via a Bayesian network 140. In some embodiments, the Bayesian network 140 is a part of the network 101 of FIG. 1. The user interface module 230 comprises a selection module 231, a display 232, a management module 233 and a storage module 234. The selection module 231 is structured for facilitating the user selection of an indication of resource (e.g., service). A representation of the interface of the selection module is illustrated in FIG. 4. The management module 233 that allows the user to view and manage the information regarding the resources (e.g., services).

FIG. 3 illustrates a high level process flow 300 for a method and process for training a machine learning (ML) data system component 146, in accordance with one embodiment of the invention. As indicated previously, some or all of the steps of the process flow 300 may be performed by the system 106 ("the system") in conjunction with the processing application module 144 and the user interface module, via the Bayesian network 140, as described with respect to FIG. 2. The present invention is structured to construct, train, implement and utilize the ML data system component 146, which in conjunction with the Bayesian network 140, is structured for performing the various functions described herein.

The construction of the ML data system component 146 will now be discussed. The system builds and trains the ML data system component 146 to employ Naïve Bayes algorithm to connect disparate data points and return a cost curve with a median price that recipient entity will likely be able to obtain. The Naïve Bayes algorithm employed by the system may not require all inputs for processing and returning a resource value of a resource. For example, if an input associated with the Naïve Bayes algorithm is not available in the data storage module 220 or not provided by the user, a predictive price for a resource may still be calculated using the Naïve Bayes algorithm. The roles that it is structured to fulfill typically occur in three stages, viz.: construction, training, and implementation. Construction and training stages will be discussed in turn below with respect to FIGS. 3 and 4, while the implementation/utilization stage will be described with respect to FIGS. 5A-6B. In the first stage, the ML data system component 146 is constructed.

During the training stage, training data is be provided to the ML data system component 146. Process flow 300 of FIG. 3 is directed to the construction of this training data. First, as indicated by block 310, the system may retrieve a plurality of historical service files associated with one or more historical service events from one or more data storage locations. In some instances, the plurality of historical service files may comprise the historical/previous resource value offers (e.g., previous offers for services received from or transmitted to source entities/suppliers), historical supplier bid data, historical contract data, historical organization data, prior purchase data, and/or the like. Here, the one or more historical service events may refer to prior service offer/bid events, prior purchase events, prior service initiation events, and/or other events associated prior services rendered or offered. Typically, the plurality of historical service files comprise unstructured data, particularly with respect to historical contract data. In some embodiments, the training data may be associated with a predetermined historical time interval, such as fifteen years' worth of plurality of historical service files.

Next, at block 320, the system may parse each of the plurality of historical service files to determine (i) an associated service category, and (ii) one or more historical service level parameters associated with each of the one or more historical service events. Typically, a service category of a temporal resource such as a service may refer to the type of resource. As non-limiting examples, the service category may be medical service type 1, patient service type 4, hospital facility maintenance service type B, and/or the like. The service level parameters may vary for different service categories and may refer to the inherent components and particulars of the temporal resource or service such as, turn-around time, service class, geographic locations, associated supplier, Consumer Price Index (CPI), fuel prices, labor rates, quality levels, pickup frequencies, on-time delivery percentages, and/or the like. Here, the system may parse each file or document at locations where the desired data is likely to be present.

Subsequently, the system may extract unstructured data associated with at least the one or more historical service level parameters associated with each of the one or more historical service events from the plurality of historical service files, as indicated by block 330. This unstructured data may be in a natural language form, descriptive form, and/or the like, and may vary from one historical service file to another.

Next, at blocks 340 and 350, the system may transform the extracted unstructured data associated with the one or more historical service level parameters associated with each of the one or more historical service events into structured training data, and construct one or more training data files comprising the structured training data. As a non-limiting instance, in one embodiment, here, the system may embed the extracted data into a database, such that the database comprises (i) an associated service category, and (ii) one or more historical service level parameters associated with each of the one or more historical service events, and ultimately the resource value or price associated with each of the one or more historical service events. In some embodiments, this may take the form of a table, with each historical service event being represented by a row, with its service category and historical service level parameters being represented in the associated columns. In other words, the system may construct a column for each service category and historical service level parameters, for each row of the historical service events. In some embodiments, the volume of data may be immense and may comprise greater than 100,000 rows for each type of temporal resource or service and numerous columns. In this manner, myriad combinations of service level parameters and associated resource values may be tabulated, which would then be ultimately employed to train the ML data system component 146.

FIG. 4 illustrates a high level process flow 400 for a method and process for training a machine learning (ML) data system component 146, in accordance with one embodiment of the invention in conjunction with the training data generated in accordance with process flow 300 above. As indicated previously, some or all of the steps of the process flow 400 may be performed by the system 106 ("the system") in conjunction with the processing application module 144 and the user interface module, via the Bayesian network 140, as described with respect to FIG. 2.

As indicated by block 410, the system may provide the one or more training data files to the ML data system component as an input.

Next, as indicated by block 420, the ML data system component 146 may be trained to determine the first set of data structure parameters, for a given temporal resource or service. Here, the ML data system component 146 is trained to determine the possible parameters for a temporal resource or service input by a user for pricing. The ML data system component 146 is further trained to determine the second set of data structure parameters of the first set of data structure parameters that are structured to modify a resource value of the service. In other words, the ML data system component 146 is trained to determine the second set of data structure parameters, i.e., the combination(s) of the parameters that are likely to affect the resource value or price of the temporal resource or service input by the user for pricing. Here, the ML data system component 146 may assign weights to the second set of data structure parameters based on the determining importance parameters for each of them. Moreover, the ML data system component 146 is trained to construct the constructed dynamic resource value for the service (i.e., predicted price for a particular set of parameters input by a user), and/or construct the dynamic service level parameters for the service (i.e., available parameters for a particular resource value or price input by a user).

The accuracy of the prediction of the closest matched patterns, determined service level parameters, and predicted prices by the ML data system component 146 typically improves over training iterations. Improving the accuracy of the prediction comprises determination of the accuracy during the training phase. The accuracy of the prediction during initial stages of training is determined based on comparing results provided by the ML data system component 146 to predetermined standards/metrics. The ML data system component 146 also undergoes accuracy testing using a different set of testing data files for determining and improving the accuracy of the predictions.

Once the ML data system component 146 has been built/constructed and trained in the foregoing manner, the trained ML data system component 146' can be employed to perform customized processing temporal resources, as will now be described with respect to process flows 500A-600B of FIGS. 5A-6B. As alluded to above, the trained ML data system component 146' may be employed in two ways. First, the user may provide some or all of the parameters for a particular temporal resource or service, and request construction of a predicted resource value or price for the same, at a current time or at a future time. This scenario is described with respect to FIGS. 5A-5B. Second, the user may provide an acceptable resource value or price for a particular temporal resource or service, and request a prediction of the parameters that would be available for the particular temporal resource or service, at the requested resource value or price. This scenario is described with respect to FIGS. 6A-6B.

FIGS. 5A and 5B illustrate a high level process flows 500A-500B for a method and process for customized processing of temporal resources, in accordance with one embodiment of the invention. As indicated previously, some or all of the steps of the process flows 500A-500B may be performed by the system 106 ("the system") in conjunction with the processing application module 144 and the user interface module, via the Bayesian network 140, as described with respect to FIG. 2.

As illustrated by block 510, the system may receive, via the first operative communication channel, a first user input from an input device of the user device, wherein the first user input is associated with a request for construction of a resource data structure associated with a service with one or more predetermined service level parameters. In other words, the user may provide some or all of the parameters for a particular temporal resource or service, and request construction of a predicted resource value or price for the same, at a current time or at a future time. One or more inputs from the user (e.g., first user input, one or more parameters, or the like) may be received via a user interface provided by the system. An example of such an interface (e.g., interfaces 800 and 900) is illustrated in FIG. 8 and FIG. 9.

Next, the system may determine at least one first service parameter associated with the one or more predetermined service level parameters of the service based on analyzing the first user input, as indicated by block 520. In this regard, the system may analyze the user input to determine the type of service, a category of service, and/or the like.

The system may activate a machine learning (ML) data system component, wherein the ML data system component is structured for establishing links between disparate data structures for analyzing data associated with temporal service resources, as indicated by block 530. Subsequently, the system may determine, via the ML data system component, a first set of data structure parameters associated with the (i) at least one first service parameter, and/or (ii) the service, as indicated by block 540. Here, the ML data system component 146 is trained to determine the possible parameters for a temporal resource or service input by a user for pricing. At block 550, the system may determine via the ML data system component, a second set of data structure parameters of the first set of data structure parameters that are structured to modify a resource value of the service. In other words, the ML data system component 146 is trained to determine the second set of data structure parameters, i.e., the combination(s) of the parameters that are likely to affect the resource value or price of the temporal resource or service input by the user for pricing.

Next, the system may construct, via the ML data system component, the resource data structure for the service based on at least the second set of data structure parameters, wherein the resource data structure is associated with a constructed dynamic resource value for the service, as indicated by block 560. Here, the system may determine a predicted resource value or price for the parameters input by the user. This predicted resource value or price may take the form of a plurality of possible price values coupled with the probability of each price value being available. Typically, the accuracy of the predicted price is directly proportional to the number of input parameters. For certain categories of services, the price may be affected by volume for services. The ML data system component may be tuned during training to account for the change in volume for services.

The system may transmit, via the first operative communication channel, a control signal to the user device to cause a display device of the user device to present an interface comprising a representation of the resource data structure, as indicated by block 570. Here, the system may construct a graphical representation 830 of the dynamic resource value for the service (e.g., a bell curve, a graphical plot 840 on a X-Y axis with the dynamic resource value at the X-axis plotted against another attribute (e.g., time, number of units, and/or the like) the Y-axis, and/or the like). In some embodiments, the graphical plot 840 may further comprise graphical user interface elements (GUIs) such as median GUI element 842 depicting a median of the dynamic resource value, quantile GUI element 1 844a (e.g., depicting the $5^{th}$ quantile), and/or a quantile GUI element N 844n (e.g., depicting the $95^{th}$ quantile). In some instances, these GUI elements may be dynamic an interactive, such that graphical modification or manipulation of these GUI elements by the user at the interface 800 may trigger corresponding transformations in the rest of the graphical plot, and/or vice versa. As another non-limiting example, the graphical representation 930 of the dynamic resource value is illustrated in FIG. 9, where the dynamic resource value is depicted as a graphical plot 940 (e.g., depicting a cost curve) on a X-Y axis with the dynamic resource value at the X-axis plotted against another attribute (e.g., time, number of units, and/or the like) the Y-axis, and/or the like). In some embodiments, the graphical plot 940 may further comprise graphical user interface elements (GUIs) such as median GUI element 942 depicting a median of the dynamic resource value (e.g., a median price or cost), quantile GUI element 1 944a (e.g., depicting the $5^{th}$ quantile), and/or a quantile GUI element N 944n (e.g., depicting the $95^{th}$ quantile). In some instances, these GUI elements may be dynamic an interactive, such that graphical modification or manipulation of these GUI elements by the user at the interface 900 may trigger corresponding transformations in the rest of the graphical plot, and/or vice versa.

In some embodiments, e.g., as illustrated by the graphical user interface 800 of FIG. 8, the graphical representation of the dynamic resource value 830 is structured to be adaptive and interactive such that modifications to the second set of data structure parameters via corresponding GUI elements 831 is structured to cause a modification to the graphical representation of the dynamic resource value. In some instances, the graphical representation of the dynamic resource value comprises (i) a graphical representation of a plurality of resource value elements, and (ii) a probability element coupled with each of the plurality of resource value elements, wherein the dynamic resource value is associated with a prediction for a future direction of the dynamic resource value for the service.

Subsequently, the system may construct an actionable source entity resource instruction file (e.g., an order sheet) for transmitting it to an associated source entity or supplier, in response to receiving a second user input received from the user device, as indicated by block 580. The system may then establish a second operative communication channel with a source entity system, and transmit, via the second operative communication channel, the source entity resource instruction file to the source entity system. At block 590, the system may receive, via the second operative communication channel, a source entity response indicating confirmation of (i) the constructed dynamic resource value for the service, and/or (ii) the constructed dynamic service level parameters for the service from the source entity or supplier.

FIGS. 6A and 6B illustrate a high level process flows 600A-600B for a method and process for customized processing of temporal resources, in accordance with one embodiment of the invention. As indicated previously, some or all of the steps of the process flows 600A-600B may be performed by the system 106 ("the system") in conjunction with the processing application module 144 and the user interface module, via the Bayesian network 140, as described with respect to FIG. 2.

As illustrated by block 610, the system may receive, via the first operative communication channel, a first user input from an input device of the user device, wherein the first user input is associated with a request for construction of a resource data structure associated with a service associated with a resource value element. In other words, the user may provide an acceptable resource value or price for a particular temporal resource or service, and request a prediction of the parameters that would be available for the particular temporal resource or service, at the requested resource value or price.

Next, the system may determine at least one first service parameter associated with the service based on analyzing the first user input, as indicated by block 620. In this regard, the system may analyze the user input to determine the type of service, a category of service, and/or the like.

The system may activate a machine learning (ML) data system component, wherein the ML data system component is structured for establishing links between disparate data structures for analyzing data associated with temporal service resources, as indicated by block 630. Subsequently, the system may determine, via the ML data system component, a first set of data structure parameters associated with the (i) at least one first service parameter, and/or (ii) the service, as indicated by block 640. At block 650, the system may determine, via the ML data system component, a second set of data structure parameters of the first set of data structure parameters that are structured to modify a resource value of the service. In other words, the ML data system component 146 is trained to determine the second set of data structure parameters, i.e., the combination(s) of the parameters that are likely to affect the resource value or price of the temporal resource or service input by the user for pricing.

Next, the system may construct, via the ML data system component, the resource data structure for the service based on at least the second set of data structure parameters, wherein the resource data structure is associated with constructed dynamic service level parameters for the service based on at least the second set of data structure parameters, as indicated by block 660. Here, the system may determine the best available combinations of the service level parameters for the specified resource value or price.

The system may transmit, via the first operative communication channel, a control signal to the user device to cause a display device of the user device to present an interface comprising a representation of the resource data structure, as indicated by block 670.

Subsequently, the system may construct an actionable source entity resource instruction file (e.g., an order sheet) for transmitting it to an associated source entity or supplier, in response to receiving a second user input received from the user device, as indicated by block 680. The system may then establish a second operative communication channel with a source entity system, and transmit, via the second operative communication channel, the source entity resource instruction file to the source entity system. At block 690, the system may receive, via the second operative communication channel, a source entity response indicating confirmation of (i) the constructed dynamic resource value for the service, and/or (ii) the constructed dynamic service level parameters for the service from the source entity or supplier.

FIG. 7 illustrates a high level process flow 700 for a method and process for processing resource transfers and constructing resource values, in accordance with one embodiment of the invention. As indicated previously, some or all of the steps of the process flow 700 may be performed by the system 106 ("the system") in conjunction with the processing application module 144 and the user interface module, via the Bayesian network 140, as described with respect to FIG. 2.

As illustrated by block 710 of FIG. 7, the system may receive a user input for generating indicators of resources.

An example of the user input received via the user interface provided by the system is illustrated in FIG. 8. The user input may comprise customized resource value offers (e.g., customized offer prices), e.g., resource value offers (e.g., customized offer prices) received from source/supplier entities. Here, the user can input customized offer prices into the selection module 231 to generate selected indications of the resources (e.g., services). The user selected indications are then transmitted to the processing application module 144 via the Bayesian network 140. Here, the selected indications may comprise categories, levels, yearly usage, service locations, states, and turn-around time of the services.

In response, the system may analyze the user selected indicators associated with the user input, via the predictive resource value provider module 212 to generate the resource value offers (e.g., offer prices) of the resources (e.g., services), as indicated by block 720. Moreover, the user can selectively adjust the selected indications. In response to the user's adjustments, the system may synchronously alter/adjust the resource values (e.g., offer prices) of the resources (e.g., services) to determine a median price.

Next, at block 730, the system executes the resource value construction module 210 to generate the resource value offers (e.g., offer prices) of the resources (e.g., services). Here, the system analyzes historical/previous resource value offers (e.g., previous offer prices), via the predictive resource value advisor module 213. In some instances, the generated resource value offers (e.g., offer prices) may comprise the historical/previous resource value offers (e.g., previous offer prices). The generated resource value offers (e.g., offer prices) may then be provided to the user via the display 232 so that the user can decide whether to accept the resource value offers (e.g., offer prices) from the source/supplier entities or organizations.

In some embodiments, as illustrated by block 740, the system is configured to determine a prediction of a future resource value (e.g., future price) via the predictive resource value provider module 212. Here, the predictive resource value provider module 212 is configured to receive the selected indications to determine a prediction for a future direction of the resource value offer (e.g., offer price) of the resource (e.g., service). In some embodiments, the predictive analyzer module 214 is configured to analyze the customized resource value offers (e.g., customized offer prices) and the future direction of the resource value (e.g., price) and transmit them to the user device. The user may then determine whether the customized offer prices are reasonable, or the user can change the source/supplier entities which provide the resources (e.g., services).

In accordance with the steps in blocks 710-740, in some embodiments, the management module 233 is configured to provide a precision benchmarking report which comprises the competitiveness of the resource values/pricing and quality of the resource (e.g., service) levels in a category. In addition, the precision benchmarking report further comprises outlines of pricing for that resource/service under different service levels. The report may be similar to the interface 800 of the user interface module 230 illustrated by FIG. 8.

Some embodiments may include a method performed by a computer for providing pricing information for the services. The method may comprise the steps of: providing a computer-executable platform having a resource value construction module and a data storage module to provide a supplier bid data, a contract data, an organization data, and a prior purchase data to the resource value construction module; providing a user interface having a selection module that provides the user to select an indication of the services; providing selected indications of the services by the selection module and receiving the selected indications by the resource value construction module; and analyzing the selected indications of the services to generate offer prices of the services.

In one aspect, the data storage module comprises a supplier bid data, which includes previous offer prices which a plurality of suppliers have offered to provide services.

In another aspect, the data storage module comprises a contract data module which includes contract values, spends, and terms.

In yet another aspect, the data storage module comprises an organization report data which includes reports from organizations, wherein the reports comprise current price offers with a similar service level.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s). The computer program product comprises a non-transitory computer-readable storage medium having computer-executable instructions.

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

Many alterations and modifications may be made by those having ordinary skill in the art without departing from the spirit and scope of the disclosed embodiments. Therefore, it must be understood that the illustrated embodiments have been set forth only for the purposes of example and that it should not be taken as limiting the embodiments as defined by the following claims. For example, notwithstanding the fact that the elements of a claim are set forth below in a certain combination, it must be expressly understood that the embodiment includes other combinations of fewer, more or different elements, which are disclosed herein even when not initially claimed in such combinations.

Thus, specific embodiments and applications of a method for using a machine learning algorithm and a natural language processing to categorize service suppliers have been disclosed. It should be apparent, however, to those skilled in the art that many more modifications besides those already described are possible without departing from the disclosed concepts herein. The disclosed embodiments, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiments. In addition, where the specification and claims refer to at least one of something selected from the group consisting of A, B, C . . . and N, the text should be interpreted as requiring at least one element from the group which includes N, not A plus N, or B plus N, etc.

The words used in this specification to describe the various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims, therefore, include not only the combination of elements which are literally set forth but all equivalent structure, material or acts for performing substantially the same function in substantially the same way to obtain substantially the same result. In this sense, it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub combination or variation of a sub combination.

What is claimed is:

1. A system for customized processing temporal resources, wherein the system is structured for adapting non-temporal resource systems and establishing links between disparate data structures for analyzing data associated with temporal service resources via a Bayesian network, the system comprising:

one or more memory devices having computer readable code stored thereon;

at least one network communication device;

one or more processing devices operatively coupled to the one or more memory devices and the at least one network communication device, wherein the one or more processing devices are configured to execute the computer readable code to:

establish a first operative communication channel with a first user device;

receive, via the first operative communication channel, a first user input from an input device of a user device, wherein the first user input is associated with a request for construction of a resource data structure associated with a service;

retrieve a plurality of historical service files from one or more data storage locations, wherein the plurality of historical service files comprise unstructured data associated with one or more historical service events;

parse each of the plurality of historical service files to determine (i) an associated service category, and (ii) one or more historical service level parameters associated with each of the one or more historical service events;

extract unstructured data associated with at least the one or more historical service level parameters associated with each of the one or more historical service events from the plurality of historical service files;

transform the extracted unstructured data associated with the one or more historical service level parameters associated with each of the one or more historical service events into structured training data;

construct one or more training data files comprising the structured training data;

train a machine learning (ML) data system component to determine a first set of data structure parameters, determine a new set of data structure parameters of the first set of data structure parameters that are structured to modify a resource value of the service, and construct a dynamic resource value for the service or construct a dynamic service level parameters for the service, based on training the ML data system component with the one or more historical service events of the one or more training data files;

determine at least one first service parameter associated with the service based on analyzing the first user input;

activate the trained ML data system component, wherein the trained ML data system component is structured for establishing links between disparate data structures for analyzing data associated with temporal service resources;

determine, via the trained ML data system component, a first set of data structure parameters associated with the (i) at least one first service parameter from the first user input, or (ii) the service;

determine, via the trained ML data system component, the new set of data structure parameters of the first set of data structure parameters that are structured to modify a resource value of the service;

construct, via the trained ML data system component, the resource data structure for the service based on at least the new set of data structure parameters, wherein the resource data structure is associated with (i) a constructed dynamic resource value for the service, or (ii) constructed dynamic service level parameters for the service based on at least the new set of data structure parameters;

improve an accuracy of the ML data system component by training the trained ML data system component using the new set of data structure parameters based on comparing the constructed resource data structure with a set of predetermined metrics from the training of the ML data system component; and transmit, via the first operative communication channel, a control signal to the user device to cause a display device of the user device to present an interface comprising a representation of the resource data structure.

2. The system of claim 1:
wherein the first user input for construction of the resource data structure is associated with one or more predetermined service level parameters associated with the service;

wherein the at least one first service parameter is the one or more predetermined service level parameters determined based on analyzing the first user input; and wherein constructing, via the trained ML data system component, the resource data structure for the service further comprises:

constructing the dynamic resource value for the service, wherein the dynamic resource value for the service is structured to adapt to the one or more predetermined service level parameters associated with the service associated with a predetermined time interval.

3. The system of claim 2, wherein presenting the representation of the resource data structure comprises:

constructing a graphical representation of the dynamic resource value for the service; and presenting the graphical representation of the dynamic resource value via the interface on the display device of the user device, wherein the graphical representation of the dynamic resource value is structured to be adaptive and interactive, wherein modifications to the new set of data structure parameters is structured to cause a modification to the graphical representation of the dynamic resource value.

4. The system of claim 3, wherein the graphical representation of the dynamic resource value comprises (i) a graphical representation of a plurality of resource value elements, and (ii) a probability element coupled with each of the plurality of resource value elements, wherein the dynamic resource value is associated with a prediction for a future direction of the dynamic resource value for the service.

5. The system of claim 1:
wherein the first user input for construction of the resource data structure is associated with a resource value element for the service;

wherein the at least one first service parameter is determined based on analyzing the service; and wherein constructing, via the trained ML data system component, the resource data structure for the service further comprises:

determining a first combination of the new set of data structure parameters that produce a temporary resource value that is within a predetermined matching threshold from the resource value element; and constructing the dynamic service level parameters based on the dynamic service level parameters matching the first combination of the new set of data structure parameters.

6. The system of claim 5, wherein presenting the representation of the resource data structure comprises:

constructing a graphical representation of the dynamic service level parameters for the service; and presenting the graphical representation of the dynamic service level parameters via the interface on the display device of the user device.

7. The system of claim 1, wherein the one or more processing devices are further configured to execute the computer readable code to:
   construct a source entity resource instruction file associated with (i) the constructed dynamic resource value for the service, or (ii) the constructed dynamic service level parameters for the service based on at least the new set of data structure parameters, in response to receiving a second user input received from the user device;
   establish a second operative communication channel with a source entity system;
   transmit, via the second operative communication channel, the source entity resource instruction file to the source entity system; and
   receive, via the second operative communication channel, a source entity response indicating confirmation (i) the constructed dynamic resource value for the service, or (ii) the constructed dynamic service level parameters for the service.

8. The system of claim 1, wherein the one or more processing devices are further configured to execute the computer readable code to:
   embed the extracted unstructured data into a database such that the database comprises (i) an associated service category, and (ii) one or more historical service level parameters associated with each of the one or more historical service events: comprising:
   constructing a database row for each of the one or more historical service events; and
   constructing a plurality of database columns linked to the database row for each of the one or more historical service events, wherein the plurality of database columns are associated with (i) the associated service category, and (ii) the one or more historical service level parameters associated with each of the one or more historical service events.

9. The system of claim 1, wherein the ML data system component is associated with a Bayesian network.

10. The system of claim 1, wherein receiving the first user input for construction of the resource data structure associated with the service further comprises receiving a user selection of a service from a plurality of services presented at the interface of the display device of the user device.

11. A computer program product for customized processing temporal resources, the computer program product comprising at least one non-transitory computer-readable medium having computer-readable program code portions embodied therein that are structured for adapting non-temporal resource systems and establishing links between disparate data structures for analyzing data associated with temporal service resources via a Bayesian network, the computer-readable program code, when executed, cause one or more processing devices to:
   establish a first operative communication channel with a first user device;
   receive, via the first operative communication channel, a first user input from an input device of a user device, wherein the first user input is associated with a request for construction of a resource data structure associated with a service;
   retrieve a plurality of historical service files from one or more data storage locations, wherein the plurality of historical service files comprise unstructured data associated with one or more historical service events;
   parse each of the plurality of historical service files to determine (i) an associated service category, and (ii) one or more historical service level parameters associated with each of the one or more historical service events:
   extract unstructured data associated with at least the one or more historical service level parameters associated with each of the one or more historical service events from the plurality of historical service files:
   transform the extracted unstructured data associated with the one or more historical service level parameters associated with each of the one or more historical service events into structured training data; and
   construct one or more training data files comprising the structured training data;
   train a machine learning (ML) data system component to determine a first set of data structure parameters, determine a new set of data structure parameters of the first set of data structure parameters that are structured to modify a resource value of the service, and construct a dynamic resource value for the service or construct a dynamic service level parameters for the service, based on training the ML data system component with the one or more historical service events of the one or more training data files;
   determine at least one first service parameter associated with the service based on analyzing the first user input;
   activate the trained ML data system component, wherein the trained ML data system component is structured for establishing links between disparate data structures for analyzing data associated with temporal service resources;
   determine, via the trained ML data system component, a first set of data structure parameters associated with the (i) at least one first service parameter from the first user input, or (ii) the service;
   determine, via the trained ML data system component, a new set of data structure parameters of the first set of data structure parameters that are structured to modify a resource value of the service;
   construct, via the trained ML data system component, the resource data structure for the service based on at least the new set of data structure parameters, wherein the resource data structure is associated with (i) a constructed dynamic resource value for the service, or (ii) constructed dynamic service level parameters for the service based on at least the new set of data structure parameters;
   improve an accuracy of the ML data system component by training the trained ML data system component using the new set of data structure parameters based on comparing the constructed resource data structure with a set of predetermined metrics from the training of the ML data system component; and
   transmit, via the first operative communication channel, a control signal to the user device to cause a display device of the user device to present an interface comprising a representation of the resource data structure.

12. The computer program product of claim 11: wherein the first user input for construction of the resource data structure is associated with one or more predetermined service level parameters associated with the service;
   wherein the at least one first service parameter is the one or more predetermined service level parameters determined based on analyzing the first user input; and
   wherein constructing, via the trained ML data system component, the resource data structure for the service further comprises:

construct the dynamic resource value for the service, wherein the dynamic resource value for the service is structured to adapt to the one or more predetermined service level parameters associated with the service associated with a predetermined time interval.

13. The computer program product of claim 11:
wherein the first user input for construction of the resource data structure is associated with a resource value element for the service;
wherein the at least one first service parameter is determined based on analyzing the service; and
wherein constructing, via the trained ML data system component, the resource data structure for the service further comprises;
determine a first combination of the new set of data structure parameters that produce a temporary resource value that is within a predetermined matching threshold from the resource value element; and
construct the dynamic service level parameters based on the dynamic service level parameters matching the first combination of the new set of data structure parameters.

14. The computer program product of claim 11, wherein the computer-readable program code portions further comprise one or more executable portions to:
construct a source entity resource instruction file associated with (i) the constructed dynamic resource value for the service, or (ii) the constructed dynamic service level parameters for the service based on at least the new set of data structure parameters, in response to receiving a second user input received from the user device;
establish a second operative communication channel with a source entity system;
transmit, via the second operative communication channel, the source entity resource instruction file to the source entity system; and
receive, via the second operative communication channel, a source entity response indicating confirmation (i) the constructed dynamic resource value for the service, or (ii) the constructed dynamic service level parameters for the service.

15. A computer implemented method for customized processing temporal resources, wherein the method is structured for adapting non-temporal resource systems and establishing links between disparate data structures for analyzing data associated with temporal service resources via a Bayesian network, the method comprising:
establishing, by one or more processing devices, a first operative communication channel with a first user device;
receiving, by the one or more processing devices via the first operative communication channel, a first user input from an input device of a user device, wherein the first user input is associated with a request for construction of a resource data structure associated with a service;
retrieving, by the one or more processing devices, a plurality of historical service files from one or more data storage locations, wherein the plurality of historical service files comprise unstructured data associated with one or more historical service events:
parsing, by the one or more processing devices, each of the plurality of historical service files to determine (i) an associated service category, and (ii) one or more historical service level parameters associated with each of the one or more historical service events:
extracting, by the one or more processing devices, unstructured data associated with at least the one or more historical service level parameters associated with each of the one or more historical service events from the plurality of historical service files:
transforming, by the one or more processing devices, the extracted unstructured data associated with the one or more historical service level parameters associated with each of the one or more historical service events into structured training data; and constructing one or more training data files comprising the structured training data;
training, by the one or more processing devices, a machine learning (ML) data system component to determine a first set of data structure parameters, determine a new set of data structure parameters of the first set of data structure parameters that are structured to modify a resource value of the service, and construct a dynamic resource value for the service or construct a dynamic service level parameters for the service, based on training the ML data system component with the one or more historical service events of the one or more training data files;
determining, by the one or more processing devices, at least one first service parameter associated with the service based on analyzing the first user input;
activating, by the one or more processing devices, the trained ML data system component, wherein the trained ML data system component is structured for establishing links between disparate data structures for analyzing data associated with temporal service resources;
determining, by the one or more processing devices via the trained ML data system component, a first set of data structure parameters associated with the (i) at least one first service parameter from the first user input, or (ii) the service;
determining, by the one or more processing devices via the trained ML data system component, a new set of data structure parameters of the first set of data structure parameters that are structured to modify a resource value of the service;
constructing, by the one or more processing devices via the trained ML data system component, the resource data structure for the service based on at least the new set of data structure parameters, wherein the resource data structure is associated with (i) a constructed dynamic resource value for the service, or (ii) constructed dynamic service level parameters for the service based on at least the new set of data structure parameters;
improving an accuracy of the ML data system component by training the trained ML data system component using the new set of data structure parameters based on comparing the constructed resource data structure with a set of predetermined metrics from the training of the ML data system component; and
transmitting, by the one or more processing devices via the first operative communication channel, a control signal to the user device to cause a display device of the user device to present an interface comprising a representation of the resource data structure.

16. The computer implemented method of claim 15:
wherein the first user input for construction of the resource data structure is associated with one or more predetermined service level parameters associated with the service;
wherein the at least one first service parameter is the one or more predetermined service level parameters determined based on analyzing the first user input; and wherein constructing, via the trained ML data system component, the resource data structure for the service further comprises:

constructing, by the one or more processing devices the dynamic resource value for the service, wherein the dynamic resource value for the service is structured to adapt to the one or more predetermined service level parameters associated with the service associated with a predetermined time interval.

17. The computer implemented method of claim 15:

wherein the first user input for construction of the resource data structure is associated with a resource value element for the service;

wherein the at least one first service parameter is determined based on analyzing the service; and wherein constructing, via the trained ML data system component, the resource data structure for the service further comprises:

determining, by the one or more processing devices, a first combination of the new set of data structure parameters that produce a temporary resource value that is within a predetermined matching threshold from the resource value element; and constructing, by the one or more processing devices, the dynamic service level parameters based on the dynamic service level parameters matching the first combination of the new set of data structure parameters.

18. The computer implemented method of claim 15, wherein the computer implemented method further comprises:

constructing, by the one or more processing devices, a source entity resource instruction file associated with (i) the constructed dynamic resource value for the service, or (ii) the constructed dynamic service level parameters for the service based on at least the new set of data structure parameters, in response to receiving a second user input received from the user device;

establishing, by the one or more processing devices, a second operative communication channel with a source entity system;

transmitting, by the one or more processing devices via the second operative communication channel, the source entity resource instruction file to the source entity system; and receiving, by the one or more processing devices via the second operative communication channel, a source entity response indicating confirmation (i) the constructed dynamic resource value for the service, or (ii) the constructed dynamic service level parameters for the service.

\* \* \* \* \*